United States Patent
Bhandari et al.

(10) Patent No.: US 9,629,384 B2
(45) Date of Patent: Apr. 25, 2017

(54) LOW SODIUM SALT COMPOSITION

(71) Applicant: S&P Ingredient Development, LLC, Minnetonka, MN (US)

(72) Inventors: Pratik N. Bhandari, Lincoln, NE (US); Sambasiva Rao Chigurupati, Omaha, NE (US)

(73) Assignee: S & P INGREDIENT DEVELOPMENT, LLC, Minnetonka, MN (US)

( * ) Notice: Subject to any disclaimer, the term of this patent is extended or adjusted under 35 U.S.C. 154(b) by 275 days.

(21) Appl. No.: 13/863,775

(22) Filed: Apr. 16, 2013

(65) Prior Publication Data

US 2013/0243924 A1  Sep. 19, 2013

Related U.S. Application Data

(63) Continuation-in-part of application No. 12/067,009, filed as application No. PCT/US2006/034325 on Aug. 31, 2006, now Pat. No. 9,474,297, which is a continuation of application No. 11/380,522, filed on Apr. 27, 2006, now abandoned.

(60) Provisional application No. 60/755,125, filed on Dec. 30, 2005, provisional application No. 60/717,001, filed on Sep. 14, 2005.

(51) Int. Cl.
*A23L 1/237* (2006.01)
*A23L 27/00* (2016.01)
*A23L 27/40* (2016.01)

(52) U.S. Cl.
CPC ............... *A23L 1/237* (2013.01); *A23L 27/40* (2016.08); *A23L 27/82* (2016.08); *A23L 27/86* (2016.08)

(58) Field of Classification Search
CPC ........ C01B 7/03; A23L 1/0017; A23L 1/0029; A23L 1/237
See application file for complete search history.

(56) References Cited

U.S. PATENT DOCUMENTS

| 1,874,055 A |  | 8/1932 | Liebrecht |
| 1,978,040 A | * | 10/1934 | Daitz ............................ 426/649 |
| 2,500,919 A |  | 3/1950 | Cahn et al. |

(Continued)

FOREIGN PATENT DOCUMENTS

| CA | 1155330 A | 10/1983 |
| DE | 3418644 A1 | 11/1985 |

(Continued)

OTHER PUBLICATIONS

Thomas Hofmann, Chi-Tang Ho & Wilhelm Pickenhagen, Challenges in Taste Research Present Knowledge and Future Implications, American Chemical Society 2004, Nov. 11, 2003, 24 pages.

(Continued)

*Primary Examiner* — Felicia Turner
(74) *Attorney, Agent, or Firm* — Fish & Richardson P.C.

(57) ABSTRACT

The present invention relates to a low sodium salt composition and the methods used to make it. In particular, the invention relates to the combined processing of sodium and potassium chloride to produce a low sodium salt composition. The low sodium salt composition includes sodium chloride and a modified chloride salt composition. The modified chloride salt composition includes a homogenous amalgamation of chloride salts, food grade acidulant, and carrier.

18 Claims, 9 Drawing Sheets

(56) References Cited

U.S. PATENT DOCUMENTS

| | | | |
|---|---|---|---|
| 2,596,333 A | 5/1952 | Halpern et al. | |
| 2,601,112 A | 6/1952 | Freedman | |
| 2,742,366 A * | 4/1956 | Power | 426/649 |
| 2,824,008 A | 2/1958 | Perri | |
| 2,829,056 A | 4/1958 | Kemmerer | |
| 2,874,027 A | 2/1959 | Gloss | |
| 2,900,268 A | 8/1959 | Rankin et al. | |
| 2,968,566 A | 1/1961 | Munch | |
| 3,505,082 A | 4/1970 | Miller | |
| 3,514,296 A | 5/1970 | Frank | |
| 3,782,974 A | 1/1974 | Lontz | |
| 3,860,732 A | 1/1975 | Eisenstadt | |
| 4,066,799 A | 1/1978 | Cornelius et al. | |
| 4,068,006 A | 1/1978 | Moritz | |
| 4,076,846 A | 2/1978 | Nakatsuka et al. | |
| 4,216,244 A | 8/1980 | Allen, Jr. et al. | |
| 4,243,691 A | 1/1981 | Mohlenkamp, Jr. et al. | |
| 4,293,535 A | 10/1981 | Arendt | |
| 4,297,375 A | 10/1981 | Shackelford | |
| 4,340,614 A | 7/1982 | Pich et al. | |
| 4,451,494 A | 5/1984 | Roan, III | |
| 4,473,595 A | 9/1984 | Rood | |
| 4,486,456 A | 12/1984 | Thompson | |
| 4,556,566 A | 12/1985 | Bell | |
| 4,556,567 A | 12/1985 | Meyer | |
| 4,556,568 A | 12/1985 | Meyer | |
| 4,556,577 A | 12/1985 | Meyer | |
| 4,556,578 A | 12/1985 | Meyer | |
| 4,560,574 A | 12/1985 | Meyer | |
| 4,734,290 A | 3/1988 | Meyer | |
| 4,748,027 A | 5/1988 | Schou et al. | |
| 4,798,736 A | 1/1989 | Belohlawek | |
| 4,873,108 A | 10/1989 | De Rooij et al. | |
| 4,915,962 A | 4/1990 | Howard | |
| 4,931,305 A | 6/1990 | Karppanen et al. | |
| 4,963,387 A | 10/1990 | Nakagawa et al. | |
| 5,034,378 A | 7/1991 | Cox | |
| 5,064,663 A | 11/1991 | Murray et al. | |
| 5,094,862 A | 3/1992 | Bunick et al. | |
| 5,098,723 A | 3/1992 | DuBois et al. | |
| 5,098,724 A | 3/1992 | DuBois et al. | |
| 5,106,632 A | 4/1992 | Wong et al. | |
| 5,173,323 A | 12/1992 | Omari et al. | |
| 5,213,838 A | 5/1993 | Sheikh et. al. | |
| 5,288,510 A | 2/1994 | Gregory et al. | |
| 5,447,543 A | 9/1995 | Sadan | |
| 5,494,689 A | 2/1996 | Lee et al. | |
| 5,562,942 A | 10/1996 | Koh et al. | |
| 5,626,904 A | 5/1997 | Frederiksen | |
| 5,853,792 A | 12/1998 | Zolotov et al. | |
| 5,871,803 A | 2/1999 | Bonorden | |
| 5,897,908 A | 4/1999 | Berglund et al. | |
| 6,013,298 A | 1/2000 | Takano et al. | |
| 6,030,535 A | 2/2000 | Hayashi et al. | |
| 6,048,569 A | 4/2000 | Garcia et al. | |
| 6,090,419 A | 7/2000 | Popplewell et al. | |
| 6,541,050 B1 | 4/2003 | Bonorden | |
| 6,632,467 B1 | 10/2003 | Salvi | |
| 6,743,461 B1 | 6/2004 | Vasquez | |
| 6,753,023 B2 | 6/2004 | Hammond | |
| 6,783,788 B2 | 8/2004 | Kuroda et al. | |
| 6,787,169 B1 | 9/2004 | Maki | |
| 6,926,918 B2 | 8/2005 | LeBlanc | |
| 7,208,189 B2 | 4/2007 | Ghosh et al. | |
| 7,402,328 B2 | 7/2008 | Vasquez | |
| 7,452,563 B2 | 11/2008 | Salemme | |
| 7,455,872 B2 | 11/2008 | Salemme | |
| 7,794,768 B2 | 9/2010 | Dewis | |
| 7,820,225 B2 | 10/2010 | Zuniga | |
| 7,854,956 B2 | 12/2010 | Flores Zuniga | |
| 7,867,520 B2 | 1/2011 | Ikeda | |
| 8,197,878 B2 | 6/2012 | Chigurupati | |
| 8,231,924 B2 | 7/2012 | Ganesan et al. | |
| 8,231,925 B2 | 7/2012 | Ganesan | |
| 8,329,236 B2 | 12/2012 | Chigurupati et al. | |
| 8,372,463 B2 | 2/2013 | Zuniga | |
| 8,409,653 B2 | 4/2013 | Shimono et al. | |
| 8,435,555 B2 | 5/2013 | Minter et al. | |
| 8,501,253 B2 | 8/2013 | Maeki et al. | |
| 8,802,181 B2 | 8/2014 | Grossbier et al. | |
| 8,932,661 B2 | 1/2015 | Shimono et al. | |
| 8,999,425 B2 | 4/2015 | Meyer | |
| 9,011,963 B2 | 4/2015 | Osterwalder et al. | |
| 2003/0008046 A1 | 1/2003 | Gerlat et al. | |
| 2003/0175202 A1 | 9/2003 | Mao | |
| 2005/0142219 A1 | 6/2005 | Dunuwila et al. | |
| 2006/0024422 A1 * | 2/2006 | Bakal | 426/649 |
| 2006/0115518 A1 | 6/2006 | Tsuchiya et al. | |
| 2007/0059428 A1 | 3/2007 | Chigurupati | |
| 2007/0184176 A1 | 8/2007 | Kuroda et al. | |
| 2007/0292592 A1 | 12/2007 | Zasypkin et al. | |
| 2008/0003339 A1 | 1/2008 | Johnson | |
| 2008/0003344 A1 | 1/2008 | Jensen | |
| 2008/0008790 A1 | 1/2008 | Jensen | |
| 2008/0038411 A1 | 2/2008 | Jensen | |
| 2008/0085360 A1 | 4/2008 | Chigurupati | |
| 2008/0193591 A1 | 8/2008 | Wada et al. | |
| 2008/0199595 A1 | 8/2008 | Zasypkin et al. | |
| 2009/0041900 A1 | 2/2009 | Zuniga | |
| 2009/0047396 A1 | 2/2009 | Ikeda et al. | |
| 2009/0104330 A1 | 4/2009 | Zasypkin | |
| 2009/0117254 A1 | 5/2009 | Chigurupati | |
| 2009/0155408 A1 | 6/2009 | Dupuy-Cornuaille et al. | |
| 2009/0169701 A1 | 7/2009 | Pfeiffer | |
| 2009/0196957 A1 | 8/2009 | Vadlamani et al. | |
| 2010/0047391 A1 | 2/2010 | Meijer et al. | |
| 2010/0047398 A1 | 2/2010 | Vasquez | |
| 2010/0075017 A1 | 3/2010 | Nishimura et al. | |
| 2010/0227023 A1 | 9/2010 | Wassergord et al. | |
| 2010/0239740 A1 | 9/2010 | Meyer | |
| 2010/0303853 A1 | 12/2010 | Lejeune et al. | |
| 2011/0052785 A1 | 3/2011 | Zuniga | |
| 2011/0236543 A1 | 9/2011 | Chigurupati | |
| 2011/0244103 A1 | 10/2011 | Chigurupati | |
| 2012/0003358 A1 | 1/2012 | Vadlamani et al. | |
| 2012/0128830 A1 | 5/2012 | Chigurupati | |
| 2012/0164287 A1 | 6/2012 | Lundberg | |
| 2012/0232166 A1 | 9/2012 | Finley et al. | |
| 2013/0196001 A1 | 8/2013 | Moore et al. | |
| 2013/0224361 A1 | 8/2013 | Miyazawa et al. | |
| 2014/0044846 A1 | 2/2014 | Grossbier et al. | |
| 2014/0234525 A1 | 8/2014 | Berglund et al. | |
| 2014/0314943 A1 | 10/2014 | Adden | |
| 2014/0328991 A1 | 11/2014 | Kobayashi et al. | |
| 2014/0377381 A1 | 12/2014 | Brennan et al. | |
| 2015/0017285 A1 | 1/2015 | Stachiw et al. | |
| 2015/0110926 A1 | 4/2015 | Joly et al. | |
| 2015/0125589 A1 | 5/2015 | Tsuchiya et al. | |

FOREIGN PATENT DOCUMENTS

| | | |
|---|---|---|
| DE | 9302125 | 5/1998 |
| EP | 0124254 | 11/1984 |
| EP | 59363 B1 | 12/1984 |
| EP | 183736 B1 | 7/1990 |
| EP | 417062 B1 | 7/1993 |
| EP | 536612 B1 | 7/1995 |
| EP | 441786 B1 | 10/1995 |
| EP | 0766927 | 4/1997 |
| EP | 0809942 | 12/1997 |
| EP | 1022252 A2 | 7/2000 |
| EP | 1051086 B1 | 4/2002 |
| EP | 0919137 | 9/2003 |
| EP | 1933645 A1 | 6/2008 |
| EP | 2119372 A1 | 11/2009 |
| EP | 2007226 B1 | 7/2010 |
| EP | 2247197 B1 | 11/2012 |
| EP | 2086354 B1 | 8/2013 |
| ES | 2302576 A1 | 7/2008 |
| FR | 2196151 B1 | 10/1975 |
| FR | 2973989 A1 | 10/2012 |
| GB | 312088 A | 5/1930 |
| GB | 713803 A | 8/1954 |
| GB | 1119490 A | 7/1968 |

(56) References Cited

FOREIGN PATENT DOCUMENTS

| | | |
|---|---|---|
| GB | 2396793 | 7/2004 |
| IL | 45392 A1 | 7/1997 |
| JP | 57186460 A | 11/1982 |
| JP | 62166862 A | 7/1987 |
| JP | 2004052449 | 2/2004 |
| JP | 2008289426 A | 12/2008 |
| KR | 2007082418 A | 8/2007 |
| KR | 2009105762 A | 10/2009 |
| RU | 2414149 C2 | 3/2011 |
| SU | 1375237 A1 | 2/1988 |
| WO | WO8300081 A1 | 1/1983 |
| WO | WO9216117 A1 | 10/1992 |
| WO | WO 95/18546 | 7/1995 |
| WO | WO 96/17521 | 6/1996 |
| WO | WO 97/23593 | 7/1997 |
| WO | WO 98/02051 | 1/1998 |
| WO | WO 99/18811 | 4/1999 |
| WO | WO 99/40798 | 8/1999 |
| WO | WO03053163 A2 | 7/2003 |
| WO | WO2005086566 A2 | 9/2005 |
| WO | WO2005094615 A1 | 10/2005 |
| WO | WO2007/032941 | 3/2007 |
| WO | WO2007132123 C2 | 11/2007 |
| WO | WO2008043054 | 4/2008 |
| WO | WO2008096040 A1 | 8/2008 |
| WO | WO2009047654 A1 | 4/2009 |
| WO | WO2009116050 A1 | 9/2009 |
| WO | WO2010119282 | 10/2010 |
| WO | WO2012067673 A1 | 5/2012 |
| WO | WO2012093929 A1 | 7/2012 |
| WO | WO2013085858 A2 | 6/2013 |
| WO | WO2014071394 A1 | 5/2014 |
| WO | WO2014127003 A2 | 8/2014 |

OTHER PUBLICATIONS

Understandingfoodadditives.org, Anti-Caking Agents, archive.org, Aug. 25, 2006, 2 pages.
Mary Ellen Kuhn, Strategies for Reducing Sodium in the U.S., Food Technology, May 2010, 34-36, United States.
Barbara Katz & Lu Ann Williams, Salt Reduction Gains Momentum, Food Technology, May 2010, 25-32 United States.
Christopher M. Parry & Johannes Le Coutre, Monkeying Around With Taste, FoodScienceCentral.com, May 5, 2005, United States.
Nathan Gray, Taste Receptors Understanding May Hold Key for Low-Cal Sweeteners: Review, FoodNavigator.com, Mar. 3, 2011, United States.
Fidel Toldra & Jose M. Barat, Recent Patents for Sodium Reduction in Foods, Jul. 25, 2008, vol. 1, No. 1, Bentham Science Publishers Ltd., United States.
Thomas Hofmann, Chi-Tang Ho & Wilhelm Pickenhagen, Challenges in Taste Research Present Knowledge and Future Implications.
Jacqueline B. Marcus, R.D., Culinary Applications of Umami, Food Technology, May 2005, p. 24-290, vol. 59, No. 5.
NPL2—'Rosemary Extract', Archive.org date Sep. 28, 2004.
Lawless et al., The Taste of Calcium Chloride in Mixtures with NaCl, Sucrose and Citric Acid, 2003, vol. 15, pp. 83-89, Food Quality and Preference.
Akerboom CA1147653, Derwent Abstract, 1983.
Anti-Caking Agents—NPL reference 1.
International Search Report and Written Opinion of the International Searching Authority issued in International Application No. PCT/US2014/034405 on Jul. 29, 2014; 7 pages.
Kikuchi et al. Japanese Patent Application H05-1 03618 1993 Derwent Abstract, 2 pages.
Communication from the European Patent Office dated Jan. 25, 2010, regarding the extended European search report for European Patent Application No. 07853780.0, Applicant Rao, Chigurupati Sambas Iva, 3 pages.
European Search Report for EP 13181746, dated Sep. 18, 2013, 5 pages.
Notification of Transmittal of the International Search Report and the Written Opinion of the International Search Authority, application No. PCT/US07/80510, mailed Aug. 29, 2008, 9 pages.
Giffo-Schmitt Beate, International Preliminary Report on Patentability, International Application No. PCT/US2006/034325, issued Mar. 18, 2008, 4 pages.
Notification of Transmittal of the International Search Report and the Written Opinion of the International Search Authority, application No. PCT/US2013/068564, mailed Feb. 25, 2014, 12 pages.
Cohen, English Abstract of AR011559, Aug. 30, 2000, 1 page.
Yanitskaya, N. G, Office Action and Search Report, Russian Application No. 2015146592 on Feb. 9, 2017, 13 pages.

* cited by examiner

LOW SODIUM SALT COMPOSITION

CROSS-REFERENCE TO RELATED APPLICATION

This application is a continuation-in-part and claims benefit of U.S. application Ser. No. 12/067,009, filed Oct. 8, 2008, which is related to and claims benefit of and priority to PCT Application No. PCT/US2006/034325, filed Aug. 31, 2006, which claims benefit of and priority to U.S. patent application Ser. No. 11/380,522, filed Apr. 27, 2006, which claims priority to and the benefit of both U.S. Patent Application No. 60/755,125, filed Dec. 30, 2005 and U.S. Patent Application No. 60/717,001, filed Sep. 14, 2005, the disclosures of which are each entirely hereby incorporated herein by reference.

FIELD OF THE INVENTION

The present invention relates to a low sodium salt composition that includes a combination of sodium chloride and modified chloride salt, and the methods of making it. More particularly, the invention relates to a modified chloride salt composition that includes a homogenous amalgamation of chloride salts, food grade acidulant, and carrier.

BACKGROUND OF THE INVENTION

Salt, or sodium chloride (NaCl), is well known. While salt imparts a desirable flavor to food, too much use can result in long term adverse health risks. Because of the proliferation of salt in prepared foods and other products found in a grocery store, many people exceed the average recommended daily intake. Exceeding the recommended daily intake of sodium is a significant risk factor in developing high blood pressure and a cause or contributing factor in the rising incidence of heart disease. As such, medical professionals and governmental authorities recommend a reduction in per capita salt consumption of from about 10 to 12 g per day to a level of about 6 g per day, which is equivalent to 2400 mg of sodium.

Dietary Guidelines issued in the U.S. suggest a proposed consumption limit of 2400 mg of sodium per day and the National Academy of Science (NAS) even suggests a more stringent limit of 1500 mg of sodium per day. The NAS also recommends a potassium consumption limit of 4,700 mg per day. Typically potassium consumption is less than half of that level.

Because of these and other reasons, there are a variety of salt substitutes in the market. The classical approach to the production of salt substitutes involves combining the sodium and potassium salts, or occasionally magnesium salts, in various ratios and adding a wide variety of other additives to this mix. The other additives are generally added to mask or at least partially reduce the generally metallic/bitter taste of potassium that has generally been associated with salt substitutes containing potassium. The processing techniques used to make these products include, among others, simple blending, agglomeration, extrusion cooking, and the like.

Examples of salt substitutes are numerous. One type relates to a salt substitute that includes an inner core of potassium chloride coated with a maltodextrin, an inner core of potassium chloride coated with a mixture of maltodextrin and sodium chloride, and an inner core of potassium chloride coated with a mixture of maltodextrin, sodium chloride, and cream of tarter (potassium bitartrate). The process of making these salt substitutes includes coating the potassium chloride with a solution of maltodextrin, maltodextrin and sodium chloride, or a mixture of maltodextrin, sodium chloride, and cream of tarter.

The deficiency with these salt substitutes is that the components are compartmentalized or layered. Thus each compartment or layer is sensed, or tasted, individually, resulting in off-flavors. Accordingly, a need still exists for salt compositions, which have the same taste and appearance as salt, and are easy and inexpensive to make.

SUMMARY OF THE INVENTION

The preferred salt composition or salt substitute of the present invention includes sodium chloride, potassium chloride, carrier, and acidulant in which the weight ratio of sodium to potassium is from about 0.1 to about 9, preferably from about 0.4 to about 3, more preferably from about 0.6 to about 1.5 and most preferably about 1.0. This salt composition or salt substitute can be used to replace table salt in order to reduce sodium content. In preferred embodiments, it is made by combining potassium chloride and sodium chloride (from about 10% to 90% by weight of dry mix), carrier (from about 10% to 80% by weight of dry mix), and an acidulant, preferably citric acid (from about 0.1% to 10% by weight of dry mix) in appropriate sequence in boiling water (from about 20 to about 60% by weight in liquid matrix). The aqueous mixture is further heated to a desired consistency/viscosity and then dried. The homogenous mixture of chloride salts, acidulant and carrier produces a Modified Chloride salt ("MCS") that is generally free of the typical bitterness associated with potassium chloride and is also generally free of savory or other foreign flavors. The MCS may be in liquid or solid form. In some embodiments, the MCS is then blended with sodium chloride in a desired weight ratio of sodium to potassium and ground to produce any desired particle size. In some embodiments, sodium chloride is combined with potassium chloride, acidulant, and carrier in the aqueous solution to produce a sodium-containing MCS.

In some embodiments, the MCS is dried by methods commonly known in the art, including drum drying or spray drying. In alternate embodiments, MCS may be made by an enhancement process described herein.

These processes surprisingly produce a suitable salt composition or salt substitute without a need for using any other additives, masking agents, or inhibitors commonly employed in prior art salt substitutes. In the most preferred embodiments of the present invention as described above, the weight ratio of sodium to potassium will be generally about 1:1; however, in other embodiments, the ratio may be about 1:2 or as much as 1:4, depending on the KCl/NaCl ratio desired in the final product.

The modified chloride salt composition of the present invention is a homogeneous amalgamation of chloride salts, food grade acidulant, and carrier. Each particle comprising the modified chloride salt composition contains a homogeneous mixture of chloride salt, food grade acidulant, and carrier molecules throughout its form. The individual components of chloride salt, food grade acidulant, and carrier are not identifiable within each particle of the composition under magnification.

Suitable salts of the modified chloride salt include potassium, sodium, magnesium, calcium, ammonium, and combinations thereof. Preferably, the chloride salts are sodium chloride, potassium chloride, magnesium chloride, or a combination thereof. Alternatively, the chloride salts are preferably potassium chloride and sodium chloride.

The modified chloride salt may include from about 10% to about 95% by weight chloride salt. Preferably, the modified chloride salt includes about 15, 20, 25, 30, 35, 40, 45, 50, 55, 60, 65, 70, 75, 80, 85, 90, or 95% by weight chloride salts. More preferably, the modified chloride salt includes from about 60% to about 80% by weight chloride salts.

Suitable food grade acidulants include citric acid, malic acid, tartaric acid, fumaric acid, lactic acid, acetic acid, benzoic acid and combinations thereof. Preferably, the food grade acidulant is citric acid.

The modified chloride salt may include about 0.1% to about 10% by weight food grade acidulant. Preferably, the modified chloride salt includes about 0.1, 0.25, 0.5, 0.75, 1.0, 1.25, 1.5, 1.75, 2.0, 2.5, 3.0, 3.5, 4.0, 4.5, 5.0, 5.5, 6.0, 6.5, 7.0, 7.5, 8.0, 8.5, 9.0, 9.5% or more by weight food grade acidulant. More preferably, the modified chloride salt includes about 0.1% to about 3% by weight food grade acidulant.

Suitable carriers include starch molecules such as cereal starches, cereal flours, dextrin, maltodextrin, monosaccharide, and combinations thereof. Suitable monosaccharides include sucrose, glucose, xylose, ribose and combinations thereof. The preferred carrier may depend upon the drying technique used to produce the modified chloride salt composition. For instance, a carrier that is a cereal flour or cereal starch such as rice flour may produce a better product if drum drying is used. In contrast, a carrier that is a maltodextrin or monosaccharide may produce a better product if spray drying is used.

The modified chloride salt may include about 10% to 80% by weight carrier. Preferably, the modified chloride salt includes about 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, or 80% by weight carrier. More preferably, the modified chloride salt includes from about 10% to about 40% by weight carrier.

The modified chloride salt composition of claim may also include an additive selected such as an antioxidant, flavorant, anti-microbial agent, phosphate, colorant, anti-caking agent, and combinations thereof. The low sodium salt composition of the invention may also contain additives. Suitable additives may include antioxidant, flavorant, anti-microbial agent, phosphate, colorant, anti-caking agent, and combinations thereof.

The low sodium salt composition of the invention has lower sodium content than that of regular table salt. Preferably, the composition contains about 10-90%, lower sodium than regular salt. More preferably, the composition contains about 25%, 30%, 35%, 45%, 50%, 55% or 75% lower sodium than regular salt. More preferably, the composition contains about 50% less sodium than regular salt.

The low sodium salt composition of the invention may be in liquid or solid form. The state of the composition depends upon the intended use. Suitable uses of the compositions of the invention include as a common salt substitute for the production of products in the food industry or as spice mixtures. Exemplary products the compositions may be used in include soups, sauces, baked goods, meat products, dairy products, and breakfast cereals. Furthermore, the compositions may be used as table salt. Also, the compositions of the invention may be used in food products.

The above-described features and advantages, along with various other advantages and features of novelty are pointed out with particularity in the claims of the present application annexed hereto and forming a part hereof. Other aspects and advantages of the invention will become apparent from the following description, illustrating by way of example, principles of the present invention.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 1 shows the scanning electron microscopy image at 100× (FIG. 1A), 500× (FIG. 1B), and 1000× (FIG. 1C) magnification for spray-dried modified 50:50 NaCl/KCl homogenous composite salt;

FIG. 2 shows the scanning electron microscopy image at 100× (FIG. 2A), 500× (FIG. 2B), and 1000× (FIG. 2C) magnification for spray-dried and enhanced modified 50:50 NaCl/KCl salt after passage through a 30-mesh screen; and, FIG. 3 shows the scanning electron microscopy image at 100× (FIG. 3A), 500× (FIG. 3B), and 1000× (FIG. 3C) magnification for spray-dried and enhanced modified 50:50 NaCl/KCl salt retained on a 30-mesh screen.

DESCRIPTION OF THE PREFERRED EMBODIMENTS

In accordance with the present invention, a process for making a salt composition having the same appearance and taste as salt, while having a reduced sodium content, has been discovered. As used herein, salt, unless modified by another word (i.e. reduced-salt, potassium salt, calcium salt, modified chloride salt and the like) or used itself to modify another word (i.e. salt substitute, salt composition and the like), means sodium chloride (NaCl).

Related to that process, a resultant low sodium salt composition that includes chloride salts, carrier, and acidulant has been discovered. As used herein, a chloride salt may be any single compound such as a chloride of sodium, potassium, magnesium, calcium, lithium, ammonium, or a mixture thereof. The modified chloride salt includes a mixture of at least one chloride salt, a acidulant, and a carrier. The acidulant helps to at least partially dissolve the chloride salt making it easier for it to bind to the carrier. The carrier binds the modified chloride salt and in combination with the acidulant reduces the bitterness and off-flavors associated with the chloride salt. In addition, the modified chloride salt ("MCS") has the appearance and taste of salt, i.e. sodium chloride.

The process of making the compositions of the present invention includes contacting at least one chloride salt, acidulant, and carrier to form a MCS solution, and then drying the solution to form a powdered or granular MCS product. The process may also include blending the powdered or granular carrier modified chloride salt with sodium chloride to form a dry mixture and grinding the dry mixture to form the salt composition.

First, the process includes contacting or mixing at least one chloride salt and acidulant in an aqueous solution to form a chloride salt solution. As discussed above the chloride salt may be any compound such as a chloride of sodium, potassium, magnesium, calcium, lithium, ammonium, or a combination thereof. Preferably, the chloride salt is sodium chloride and potassium chloride. The acidulant may be any compound that increases the relative solubility of the chloride salt, at least partially dissolving it, and lowers the pH of the mixture of chloride salt, acidulant, and water. Preferably, the pH is lowered below a pH of about 7, 6, 5, 4, 3, 2, or 1. More preferably, the pH is lowered below a pH of about 4. More preferably, the pH is between a pH of about 2 to 4. The acidulant must also be edible and be of a nature such that the taste of sodium chloride will not be significantly altered by it. The acidulant, by itself or in combination with the carrier, masks the bitter or metallic off flavor associated with some chloride salts. Preferably, the acidulant is a food grade acidulant. Suitable food grade acidulants include any food grade acids, such as citric acid, tartaric acid, acetic acid, malic acid, fumaric acid, lactic acid, benzoic acid and/or their derivatives, as well as natural sources of such acids, such as lemon juice or the like. Preferably, the food grade acidulant is citric acid.

The process includes mixing from about 60% to about 80% by weight water, from about 15% to about 30% by weight chloride salts, from about 5% to about 40% carrier, and from about 0.1% to about 3% by weight acidulant. Preferably, the process includes mixing about 60-70% by weight water, 20-30% by weight chloride salts, 5-20% by weight carrier, and about 0.5-1% by weight citric acid.

Typically, the chloride salt, acidulant, and aqueous solution are mixed for a time sufficient to thoroughly dissolve the chloride salt. Generally, the chloride salt and acidulant are added to a mixing vessel containing water at a temperature of from about 175° F. to about 212° F., preferably about 180° F. The mixing vessel may be any suitable vessel having a means of agitation. Thus, when mixed, a chloride salt solution is formed.

The chloride salt solution is then mixed with a carrier, that in combination with the acidulant, masks the bitter or metallic off flavor associated with the chloride salt and forms a modified chloride salt solution. In addition, the carrier is selected such that the modified chloride salt has the appearance of salt, i.e. sodium chloride. As such, the carrier may be any short chained starch molecule that reacts with the chloride salt solution to reduce the bitter flavor of the chloride salt and produces a white colored finished product. Suitable carriers include monosaccharides, such as sucrose, glucose, xylose, and ribose, and dextrins, such as maltodextrin and dextrose, among others. Suitable carriers also include cereal starches such as rice starch, rice cereal, and rice flour. Preferably, the carrier is maltodextrin. Suitable maltodextrins have a degree of polymerization of from less than about 10 to less than about 30. The degree of polymerization is the length in monomeric or base units of the average linear polymer chain at time t in a polymerization reaction. The following formula is used to calculate the degree of polymerization:

$$DP = \frac{M_t}{M_0}$$

where
$M_t$=molecular weight at time t
$M_0$=molecular weight of one monomeric unit Any suitable maltodextrin may be used in accordance with the present invention. Preferably, the maltodextrin is water soluble and has a degree of polymerization of less than 10. For example, suitable maltodextrins, such as Maltrin M040, Maltrin M100, or Maltrin M150 may be purchased commercially from Grain Processing Corporation.

The process includes mixing from about 75% to about 90% by weight of the chloride salt solution with from about 10% to about 25% by weight of the carrier to form a modified chloride salt solution. Preferably, the process includes mixing about 87.5% by weight of the chloride salt solution with about 12.5% by weight of the maltodextrin to form a modified chloride salt solution. Generally the weight percentages will vary based on the carbon length of the carrier and the amount of chloride salt product used to make the solution. Typically, the chloride salt solution is mixed with the carrier in a suitable vessel that includes an agitation means to avoid the formation of lumps in the solution. The solution is then heated to at least about 185° F. to ensure that the mixture is smooth, fairly thick and pourable. Alternatively, the solution may then be mixed with an additional amount of water to ensure that the solution is less viscous for ease of the drying process. For example, the modified chloride salt solution may be mixed with from about 0% to about 40% by additional weight water prior to drying the solution.

The modified chloride salt solution is then dried to form a powdered or granular modified chloride salt product. Generally, any process known in the art that produces a powdered or granular carrier modified chloride salt may be used. Suitable drying processes include, without limitation, drum drying and spray drying techniques. A preferred process is spray drying. A spray drier operates by atomizing a stream of the modified chloride salt solution using compressed air in a drying chamber. The atomization breaks the solution into small droplets, thereby increasing the surface area and thus the rate of evaporation. The small size of the droplets results in a relatively large surface area that dries quickly. The particles are removed from the drier typically within 30 seconds. The temperatures of the particles during the drying process can range from wet-bulb temperature of the inlet air to above 212° F. (100° C.) as they exit in the dry state. The operating conditions may be selected according to the drying characteristics of the product and the desired granule or powder size. Typically, any spray drier design may be used in accordance with the present invention. For example the drier may be designed to have co-current, counter-current, or mixed air flow. In a co-current system the drying air and particles move through the drying chamber in the same direction. In a counter-current system the drying air and the particles move through the drying chamber in opposite directions. Finally, in a mixed air flow system the particles experience both co-current and counter-current phases.

Alternatively, the modified chloride salt solution may be used in a liquid form.

In some embodiments, the process may optionally include blending or mixing the powdered or granular modified chloride salt with sodium chloride and grinding the dry mixture to form a salt composition. The mixing or blending of the powdered or granular modified chloride salt and sodium chloride may be conducted in any suitable vessel. After the powdered or granular modified chloride salt and the sodium chloride are mixed, the dry mixture may be ground or milled to the salt composition's desired particle size. Similarly to the mixing vessel, any suitable grinder or mill may be used in accordance with this invention. Alternatively, if larger particle sizes are desired the salt composition may be enhanced.

The MCS compositions of the present invention may have any desired particle size. The MCS composition typically has a particle size larger than about 100 mesh, U.S. standard sieve size. Preferably, the MCS composition has a particle size of between about 35 and about 60 mesh. It should be recognized that the particle size of the composition is selected to meet the particular end use application. "Pretzel grade" salt generally has a particle size that passes through a 35 mesh sieve, whereas "shaker grade" salt has a particle size that passes through between a 35 and a 60 mesh sieve. "Popcorn grade" salt has a particle size that passes through a 60 mesh sieve. Once ground, the salt composition should have less than about 10% of all granules, which are finer than 100 mesh.

As used herein, mesh size refers to standard U.S. Sieve Sizes, percents refer to weight percents, and ratios refer to weight ratios. A mesh size range of, say, 8 mesh to 100 mesh means the particles fall through an 8 mesh screen and are retained on a 100 mesh screen; a mesh size of −100 mesh means the particles pass through a 100 mesh screen.

Additionally, silicon dioxide may be included in the MCS composition to prevent caking. In one aspect of the present invention from about 0.1% to about 2% by weight of silicon dioxide may be added to the composition, preferably about 1% by weight of silicon dioxide. The silicon dioxide may be added during the aqueous phase or after the drying phase.

The resultant MCS composition includes from about 10% to about 95% by weight chloride salts, from about 10% to about 80% by weight carrier, and from about 0.1% to about 10% by weight acidulant. Preferably, the resultant salt composition includes about 30-65% by weight sodium chloride, about 20-40% by weight potassium chloride, about 20-40% by weight carrier, and about 1% by weight acidulant.

Alternatively, other additives may be included in the modified chloride salt product. Suitable additives include, for example, antioxidants, to reduce the rancidity of the salted products when cooked, phosphates, to tenderize the salted food product, and/or colorants, to give the salt composition a distinct color. Suitable antioxidants include rosemary extract, butylatedhydroxytoluene, butylatedhydroxyanisole, and tocopherols, among others. Suitable phosphates include monosodium phosphate, tetrasodium pyrophosphate, sodium hexametaphosphate, monopotassium phosphate, tetrapotassium pyrophosphate, disodium phosphate, sodium tripolyphosphate, sodium acid pyrophosphate, dipotassium phosphate, and potassium tripolyphosphate. Suitable natural colorants include caramel color, turmeric, annatto, beta-carotene, paprika oleoresin, red cabbage juice, beet juice, grape skin extract, and carmine, among others. Alternatively, the antioxidant used may also act as a colorant. Preferably, the modified chloride salt product includes rosemary extract as an antioxidant. Rosemary extract may be included at a dosage of from about 100 ppm to about 1000 ppm by weight of the modified chloride salt product.

The salt composition of the present invention may be used as a substitute for salt, i.e. sodium chloride. Similarly, the salt composition of the present invention may be used in addition to or as a blend to salt. The salt composition of the present invention may be used in a variety of applications as table salt, inclusion in snack foods, baked goods, to season meats and poultries, and for other food items that have included salt. Preferably the salt composition of the present invention is used to injection marinate meats and poultries as the composition has a low viscosity and can be processed through a meat injection needle.

Modified Chloride Particle Enhancement Process

The modified chloride salt composition of the invention can be enhanced to produce particles having a larger mesh size, a variety of flavors, and a variety of textures, increased nutritional value with vitamins and minerals, increased shelf-life, or a combination thereof.

In some embodiments, the modified chloride salt composition of the invention is enhanced to produce particles having a larger mesh size. The mesh size may be 20 mesh or greater depending on the particle size desired. The mesh size average can be varied between 20-200 or more mesh. For instance, the enhancement process may be repeated to achieve particle sizes on average of about 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, and more. One skilled in the art will recognize that the mesh size depends upon the desired particle size and varies depending upon the ultimate use.

The enhancement process includes applying additional material to the modified chloride salt composition. In particular, modified chloride salt particles are contacted with an aqueous solution followed by a drying step. In some embodiments, the aqueous solution includes sodium chloride and water. A suitable aqueous solution includes about 5-30% of sodium chloride. The aqueous solution may include about 5, 10, 15, 20, 25, 30% or more sodium chloride. Preferably, the aqueous solution includes about 10-30% sodium chloride. In another embodiment, the aqueous solution may include additives. Suitable additives include those well known in the art to enhance or alter flavor, nutritional value, and color. Exemplary additives include, without limitation, flavorants, vitamins, minerals, mineral salts, bitter blocking compounds, those known in the art or yet to be discovered, and combinations thereof. In another embodiment, the enhancement process may be used for iodization of the product. One skilled in the art will recognize that the amount range for additional ingredients is only limited by solubility in the spray solvent and desired run time.

The aqueous solution may include a food grade solvent. Any food grade solvent known in the art or yet to be discovered is contemplated herein. In one embodiment, the solvent is water. In another embodiment, the solvent is a food grade solvent that is not water. In another embodiment, the solvent is a combination of a food grade solvent that is not water and water.

The drying step may be accomplished by any method known in the art. Suitable drying methods include, without limitation, spraying, continuous fluid bed dryers, dry roller compaction, wet granulation, comminuting mill, and combinations thereof. Preferably, a batch style dryer is used. More preferably, a fluid bed dryer is used.

One cycle of the enlargement process includes contacting modified chloride salt particles with an aqueous solution and subsequently drying the particles. Additional cycles of the process may be used to produce larger particles. In some embodiments, the individual particles may agglomerate to form larger particles. In some embodiments, the larger particles may subsequently be ground to produce smaller particles. In some embodiments, the enlarged particles may be blended with sodium chloride or another chloride salt to produce a low sodium salt composition.

In some embodiments, the modified chloride salt composition may be enhanced to have a specific flavor profile. Flavorants may be added to the modified potassium chloride during production. Flavorants may be added to the aqueous solution used to enhance the modified chloride composition. Suitable flavorants include any known in the art and combinations thereof. Exemplary flavorants include, without limitation, amino acids, nucleotides, seasoning powders, yeast extract, garlic powder, onion powder, and others well known in the art.

In some embodiments, the modified chloride salt composition may be enhanced to have a specific texture profile. The texture of the modified chloride salt composition may be modified by using different methods of drying or applying the aqueous solution used to enhance the modified chloride composition. Further, the texture may be modified by using additives such as hydrocolloids, gum, additives known in the art to affect texture, or combinations thereof in the aqueous solution used to enhance the modified chloride composition.

In some embodiments, the modified chloride salt composition may be enhanced to have a specific nutritional profile. Additives that enhance the nutritional value of the modified chloride salt composition may be added to the aqueous solution used to enhance the modified chloride salt composition. Suitable additives include those known in the art and combinations thereof. By way of example, vitamins, minerals, or a mixture thereof, may be added to the aqueous solution to produce a nutritionally enhanced modified chloride composition.

In some embodiments, the modified chloride salt composition may be enhanced to have an increased shelf-life. The shelf-life of the modified chloride salt composition may be enhanced by including anti-microbial agents in the aqueous solution used to enhance the modified chloride composition. Suitable anti-microbial agents include those known in the art as well as combinations thereof. Such anti-microbial agents will reduce activity of microorganisms capable of degrading the modified chloride composition.

DEFINITIONS

Unless defined otherwise, all technical and scientific terms used herein have the same meaning as is commonly understood by one of ordinary skill in the art. All patents, applications, published applications and other publications are incorporated by reference in their entirety. In the event that there is a plurality of definitions for a term herein, those in this section prevail unless stated otherwise.

As used herein, "agglomeration" or "dry mixture" refers to a combination or mixture of components such that the constituent components in the combination or mixture are indistinguishable from one another upon non-magnified visual inspection, but are distinguishable upon magnified visual inspection.

As used herein, "amalgamation" refers to a combination or mixture of components such that the constituent components in the combination or mixture are indistinguishable from one another upon magnified visual inspection.

As used herein, "homogenous" refers to a substance that is uniform throughout in composition. For instance, a homogenous mixture has the same properties throughout the sample. Examples of homogenous mixtures include brass, which is a solid solution of copper and zinc, or aqueous solutions such as thoroughly stirred mixtures of sugar in water. The term does not include heterogeneous mixtures that consist of two or more regions, or phases, that differ in properties. Heterogeneous mixtures include mixtures having different layers with each layer differing in properties. Examples of heterogeneous mixtures include a mixture of gasoline and water, where the gasoline floats on the water as a separate layer.

The following examples are simply intended to further illustrate and explain the present invention. The invention, therefore, should not be limited to any of the details in these examples.

Example 1

Preparation of Modified Chloride Salt Products

Three samples of Modified Chloride Salt products were prepared. All of the samples were prepared using the following method with additions in the given sequence:

Sample 4a: Modified Chloride Salt containing potassium chloride only, was blended with Sodium Chloride prior to milling.

1. Approximately 500 g of hot water (180QF/82QC) was weighed into a 1,000 ml beaker and placed on a hot plate using a magnetic stirrer.
2. Approximately 250 g of potassium chloride (Nutri-K®, Rhesis Inc., 235 Snyder Ave., Berkeley Heights, N.J.) was added to the hot water with constant stirring.
3. Approximately 5 g of Fine Anhydrous Citric acid (Lot No. CA4L192B4, FCC, USP-Tate &Lyle, Decatur, Ill.) was added and mixing was continued until all of the salt was in solution.
4. The final ingredient added was approximately 50 g. of Fine Rice Flour (PGP International, 351 Hanson Way, Woodland, Calif. 95776).
5. The entire sample was then heated to approximately 165° F./73° C. when the solution visibly showed a thickening of viscosity. Sample pH was 3.61 at 160° F. and viscosity was determined to be 180 cps using a Brookfield Viscometer (spindle 3, speed 30).
6. The sample was dried with a drum dryer at a steam pressure of 40 psig and drum speed of approximately 1.66 rpm and a gap clearance of approximately 0.25 inches.

The product dried easily and sheeted cleanly into very smooth homogenous flakes. The final product was very white, smooth, homogenous and very easy to crumble into smaller flakes. Final yield was approximately 280.0 g. This material was allowed to equilibrate at room temperature, blended with an equal weight of sodium chloride, then ground in a Udy Cyclone Mill through a 1 mm screen (UDY Corporation, 201 Rome Court, Fort Collins, Colo. 80524).

Sample 4b: Modified Chloride Salt product containing 50/50 Sodium Chloride and Potassium Chloride.

1. Approximately 500 g of hot water (180QF/82QC) was weighed into a 1,000 ml beaker and placed on a hot plate using a magnetic stirrer.
2. Approximately 125 g of sodium chloride (Top-Flo® evaporated salt, Cargill, Inc. Minneapolis, Minn.) and 125 g of potassium chloride (Nutri-K®, Rhesis Inc., 235 Snyder Ave., Berkeley Heights, N.J.) were added to the hot water with constant stirring.
3. Approximately 5 g of Fine Anhydrous Citric acid (Lot No. CA4L192B4, FCC, USP-Tate &Lyle, Decatur, Ill.) was added and mixing was continued until all of the salt was in solution.
4. The final ingredient added was approximately 50 g of Fine Rice Flour (PGP International, 351 Hanson Way, Woodland, Calif. 95776).
5. The entire sample was then heated to approximately 165° F./73° C. when the solution visibly showed a thickening of viscosity. The sample pH was 2.62 at 160° F. and viscosity was determined to be 820 cps using a Brookfield Viscometer (spindle 3, speed 30).
6. The sample was dried with a drum dryer at a steam pressure of 40 psig and drum speed of approximately 1.66 rpm and a gap clearance of approximately 0.25 inches.

The product dried easily and sheeted cleanly into very smooth homogenous flakes. The final product was very white, smooth, homogenous and very easy to crumble into smaller flakes. This material was allowed to equilibrate at room temperature and ground in a Udy Cyclone Mill thru a 1 mm screen (UDY Corporation, 201 Rome Court, Fort Collins, Colo. 80524). Final yield was approximately 262.9 g.

Sample 4c: Modified Chloride Salt with Lysine, and then blended with Sodium Chloride prior to milling.

4. Approximately 500 g of hot water (180° F./82° C.) was weighed into a 1,000 ml. beaker and placed on a hot plate using a magnetic stirrer.

5. Approximately 250 g of Potassium Chloride (Nutri-K®, Rhesis Inc., 235 Snyder Ave., Berkeley Heights, N.J.) was added to the hot water with constant stirring.

6. Approximately 5 g of Fine Anhydrous Citric acid (Lot # CA4L192B4, FCC, USP-Tate &Lyle, Decatur, Ill.) was added.

7. Approximately 5.0 g of L-Lysine Monohydrochloride (Ajinomoto Co., Inc., Tokyo, Japan) was added the sample.

8. The final ingredient added was approximately 50 g of Fine Rice Flour (PGP International, 351 Hanson Way, Woodland, Calif. 95776).

9. The entire sample was then heated to approximately 165° F./73° C. when the solution visibly showed thickening of viscosity. The sample pH was 3.90 at 160° F. Viscosity was 90 cps and was measured using a Brookfield Viscometer (spindle 3, speed 30) (See, Table 1).

10. The sample was dried with a drum dryer at a steam pressure of 40 psig and drum speed of approximately 1.66 rpm and gap clearance of approximately 0.25 in.

The product dried easily and sheeted cleanly into very smooth homogenous flakes. The final product was very white, smooth, homogenous and very easy to crumble into smaller flakes. The final yield was approximately 289.9 g. This material was allowed to equilibrate at room temperature, blended with an equal weight of sodium chloride, then ground in a Udy cyclone mill through a 1 mm screen (UDY Corporation, 201 Rome Court, Fort Collins, Colo. 80524). A 20 g. sample was used for sodium/potassium analysis.

TABLE 1

Results of pH and viscosity testing

| Sample | Formulation | pH@160° F. | Viscosity (cps) | Final Weight (g) |
|---|---|---|---|---|
| 4a | 250 g KCl<br>5 g citric acid<br>50 g rice flour<br>500 g water | 3.61 | 180 | 280.0 |
| 4b | 125 g salt<br>125 g KCl<br>5 g citric acid<br>50 g rice flour<br>500 g water | 2.62 | 820 | 262.90 |
| 4c | 205 g KCl<br>5 g citric acid<br>5 g L-lysine<br>50 g rice flour<br>500 g water | 3.90 | 90 | 289.9 |

Example 2

Preparation of Modified Chloride Salt Containing Potassium Chloride

Water (35 pounds, 15.9 kg) was heated to 180° F. (82° C.) in a stirred, jacketed kettle. To the heated water, potassium chloride (15 pounds, 6.8 kg) was added, stirred, and dissolved. Next, citric acid (0.22 pounds, 100 g) was added followed by the slow addition of maltodextrin (6 pounds, 2.7 kg) in small amounts, which dissolved slowly into the solution. The completed solution was transferred to a stainless steel vessel, through which it was pumped into the spray dryer. The spray-dried formulation was packed and stored in plastic, resealable bags.

Example 3

Preparation of Modified Chloride Salt Product Containing 50:50 NaCl/KCl

Water (35 pounds, 15.9 kg) was heated to 180° F. (82° C.) in a stirred, jacketed kettle. To the heated water, potassium chloride (6 pounds, 2.7 kg) and sodium chloride (9 pounds, 4.1 kg) were added, stirred, and dissolved. Next, citric acid (0.22 pounds, 100 g) was added followed by the slow addition of maltodextrin (6 pounds, 2.7 kg) in small amounts, which dissolved slowly into the solution. The pH of the formulation was measured at 2.16.

Figure 1A:
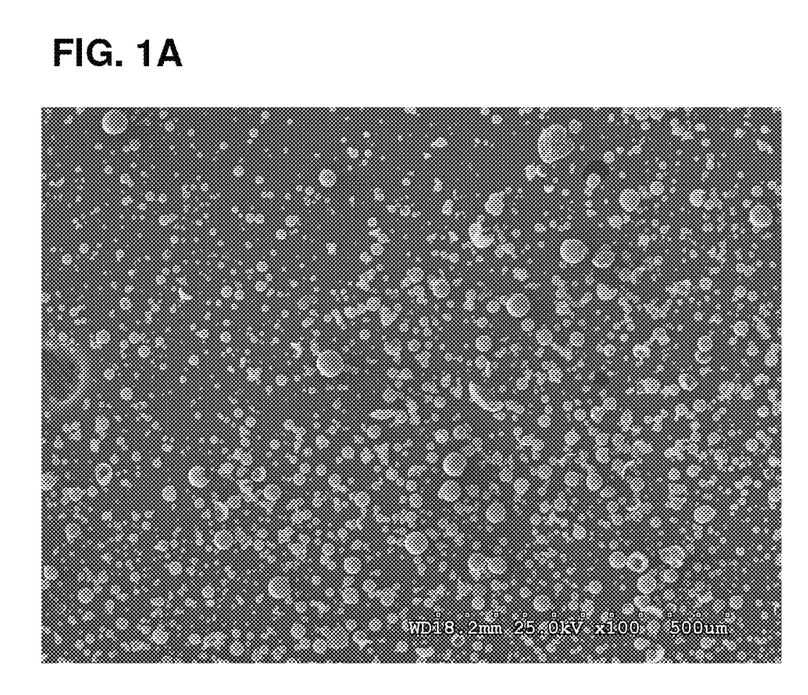
Figure 1B:
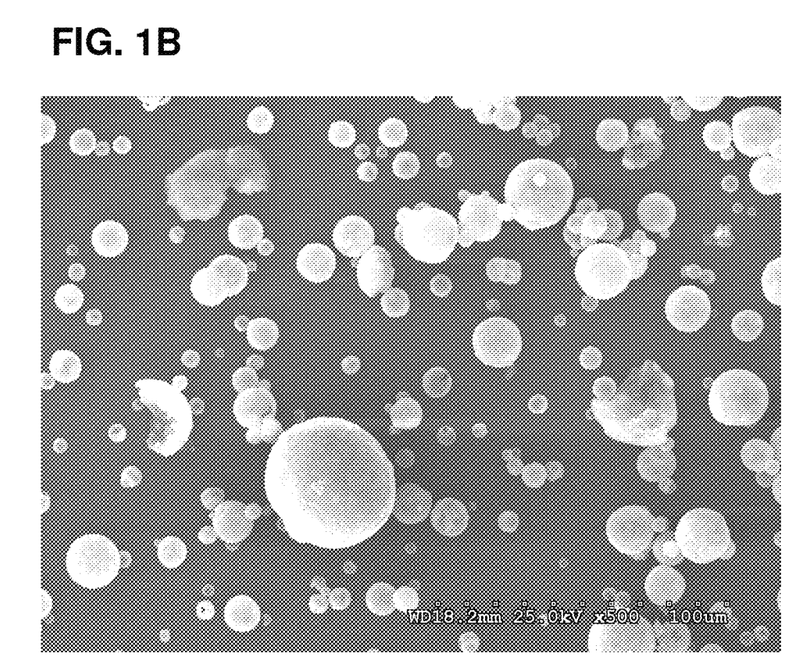
Figure 1C:
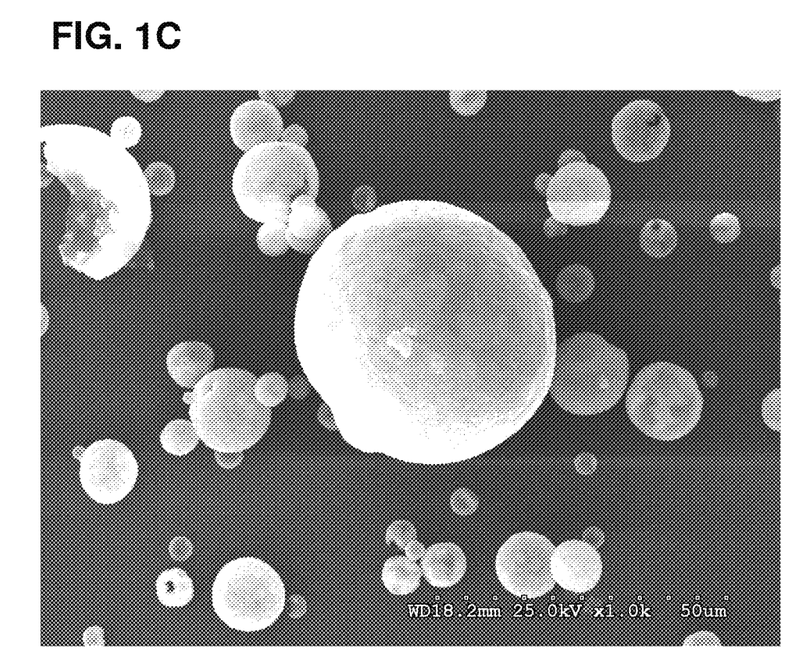

The completed solution was then transferred to a stainless steel vessel, through which it was pumped into the spray dryer. The spray-dried formulation was packed and stored in plastic, resealable bags. FIG. 1 shows the scanning electron microscopy image at 100× (FIG. 1A), 500× (FIG. 1B), and 1000× (FIG. 1C) magnification for the spray-dried modified 50:50 NaCl/KCl salt.

Figure 2A:
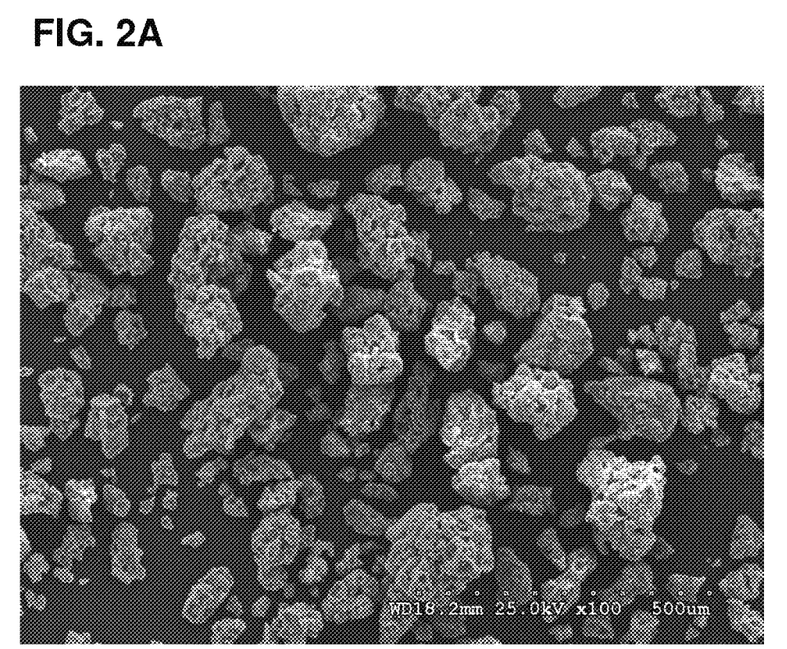
Figure 2B:
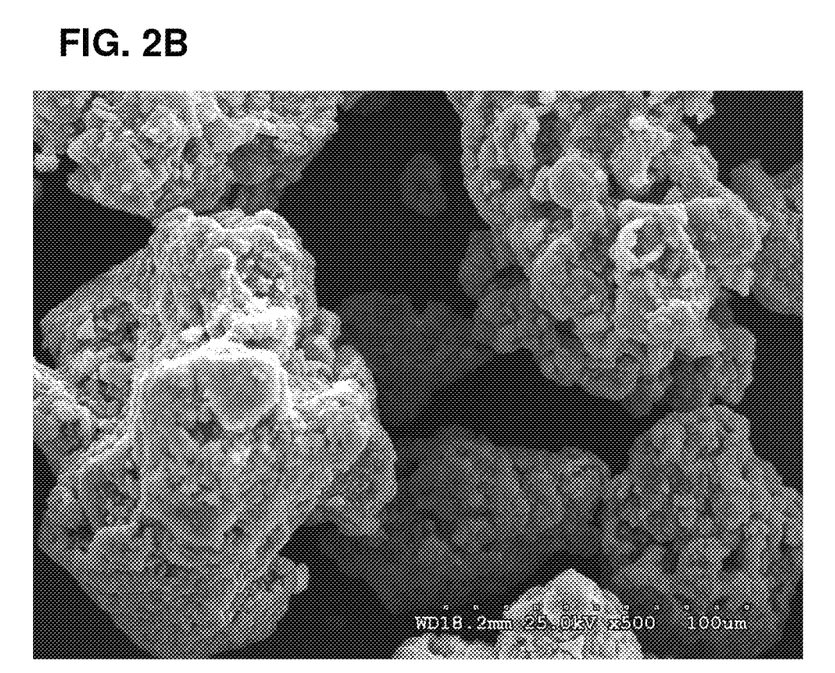
Figure 2C:
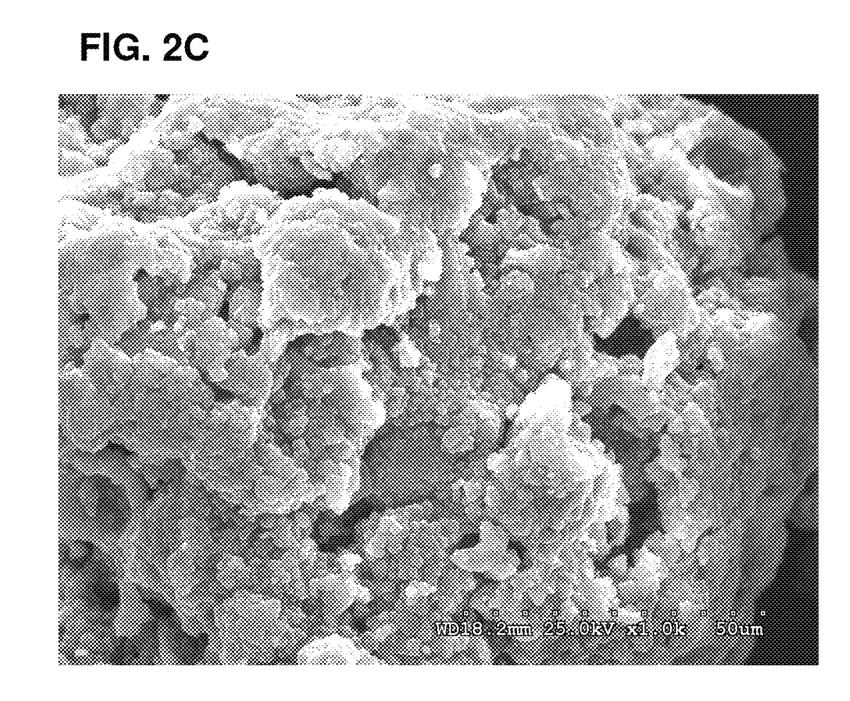
Figure 3A:
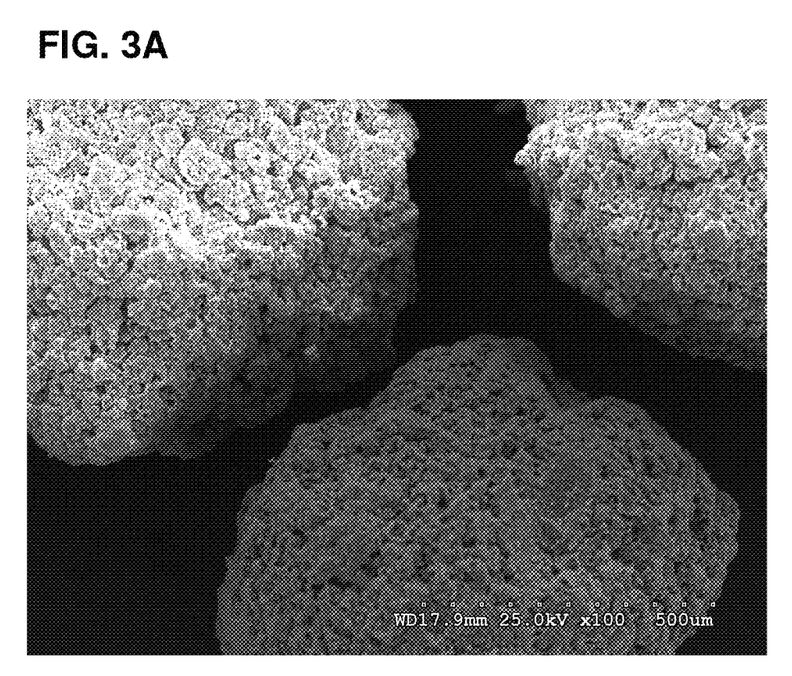
Figure 3B:
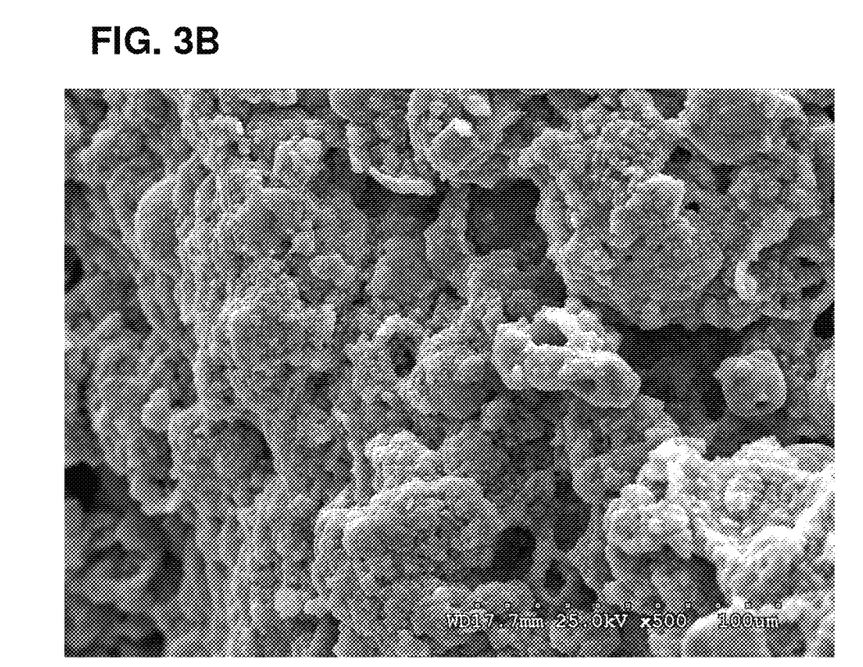
Figure 3C:
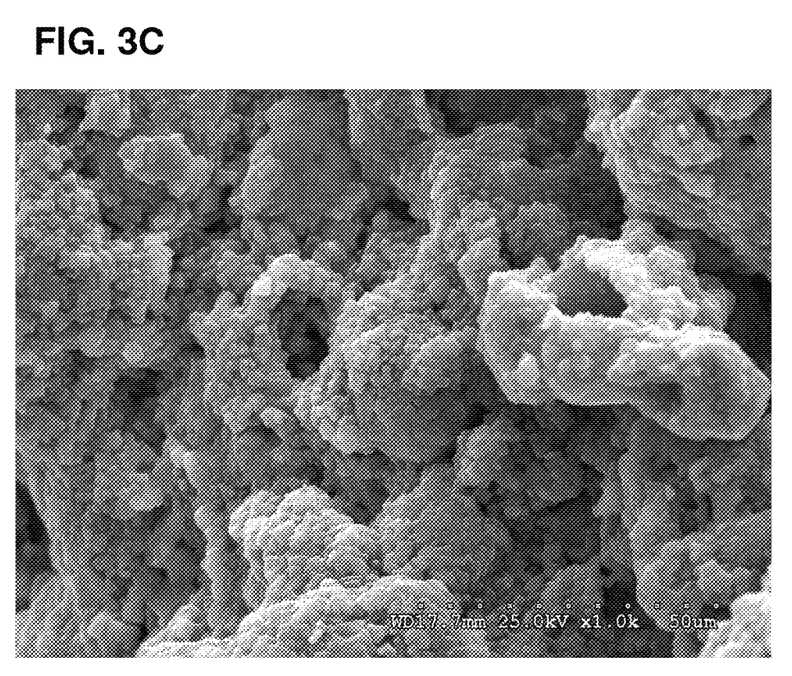

Optionally, the size of the modified 50:50 NaCl/KCl salt was enhanced. The composition prepared in Example 2 was placed in a batch fluid bed system (Glatt GPCG-1). A solution of sodium chloride and water was applied to the dry modified potassium/sodium chloride composition to initiate particle enhancement. The wetted particles were allowed to dry, completing one cycle of particle enhancement. The process of wetting the modified potassium/sodium chloride particles with a solution of sodium chloride and water followed by drying was repeated until three full cycles were completed. For this application, product temperatures were kept between 40° C. and 60° C. The solution addition rate during the wetting phase was set at 40 mL per minute. The inlet temperature was set at 95° C. The enhanced product was milled, sifted, and passed through a 30-mesh screen. FIG. 2 shows the scanning electron microscopy image at 100× (FIG. 2A), 500× (FIG. 2B), and 1000× (FIG. 2C) magnification for the spray-dried modified 50:50 NaCl/KCl salt after passage through the screen. FIG. 3 shows images for salt retained on the screen at 100× (FIG. 3A), 500× (FIG. 3B), and 1000× (FIG. 3C) magnification. Table 2 compares the weights and weight percentages for the components of modified KCl salt from Example 2 and the modified 50:50 NaCl/KCl salt from Example 3.

TABLE 2

Formulation Comparison.

| | 50:50 NaCl/KCl MCS (Ex. 3) | | | | KCl MCS (Ex. 2) | | | |
| --- | --- | --- | --- | --- | --- | --- | --- | --- |
| | Wet | | Dry | | Wet | | Dry | |
| | Weight (lbs) | Wt. % | Weight (lbs) | Wt. % | Weight (lbs) | Wt. % | Weight (lbs) | Wt. % |
| Water | 35 | 62.1% | — | — | 35 | 62.1% | — | — |
| NaCl | 9 | 16.0% | 9 | 42.2% | — | — | — | — |
| KCl | 6 | 10.7% | 6 | 28.1% | 15 | 26.6% | 15 | 70.3% |
| Maltodextrin | 6 | 10.7% | 6 | 28.1% | 6 | 10.7% | 6 | 28.1% |
| Citric acid | 0.22 | 0.4% | 0.22 | 1.0% | 0.22 | 0.4% | 0.22 | 1.0% |

Example 4

Bean Dip Prepared with MCS Products

Pinto beans were washed and sorted. Twice the volume of water was added. The beans were soaked overnight (about 18-24 hours) at room temperature. After soaking, the beans were rinsed twice and drained. Soaked beans, fresh water, oil, onion garlic, red pepper, and paprika were placed in a 2-liter Hawkins pressure cooker. Once the cooker was at full pressure, the bean mixture cooked for 17 minutes and rested until the pressure equilibrated to the atmosphere. The bean mixture was then removed from the pressure cooker. Vinegar, brown sugar, and maltodextrin were added.

The bean mixture was blended in a mixer until smooth, divided into four portions, and added to 1.5 wt % of one salt ingredient: (1) Cargill TopFlo™ Fine Flake Salt (Table salt); (2) MCS of Example 2 (33%) dry blended with Cargill TopFlo™ (67%) (MCS plus salt); or (3) MCS containing sodium product of Example 3 (Modified Potassium/Sodium Chloride Product with potassium and sodium chloride at a ratio of 50:50, MPSC). Specifically, a portion of the pureed bean mixture (1231.25 grams) was added to 18.75 grams of one of the salt products, and blended in a mixer for 2 minutes, scrapped, and blended for one more minute. The completed bean mixture cooked at 180° F. The target pH was 5.2. Actual pH was 5.13. A full list of ingredients is given at Table 3.

TABLE 3

Ingredients for Bean Dip Before Adding Salt Product.

| Ingredient | Weight Percent |
| --- | --- |
| Water (municipal tap) | 41.74% |
| Pinto beans (soaked overnight) | 51.02% |
| Olive oil | 0.93% |
| Onion (dry minced) | 0.46% |
| Red pepper (crushed) | 0.05% |
| Paprika | 0.23% |
| Garlic powder | 0.19% |
| Brown sugar (added after pressure cooking) | 1.39% |
| Vinegar (apple cider, added after pressure cooking) | 2.60% |
| Maltodextrin 040 (added after pressure cooking) | 1.39% |
| Total | 100.00% |

Example 5

Sensory Evaluation for Bean Dips

No significant differences were detected between the bean dip samples in any attribute at the 5% level (P<0.05).

Bean dip samples were made as described above in Example 4 the day before testing. The samples were refrigerated until testing. On the test day, the bean dips were left covered with aluminum foil and placed in a steam convection oven for about 15 minutes until they reached an internal temperature of about 160° F. The samples were portioned into approximately 15 g allotments into 2 oz plastic serving cups labeled with the sample's random three-digit number. A lid was secured onto each cup. They were placed into labeled pans held over a water bath at 140° F. until they were served. The samples were served one at a time in a predetermined random order. Panelists were provided with room temperature water and unsalted saltine crackers to clear their palates between samples. Data was collected using a SIMS 2000 computer system on a 15-point scale. A total of 42 people participated.

Tables 4, 5, and 6 provide the data collected from the tasting. All data, except salt level, were presented as least squares (L.M.) means, which is an average that is weighted by the whole data set. In this scale, 0 is very undesirable, 7.5 is average, and 15 is very desirable.

For salt level information, comparisons were made using the Just About Right (JAR) scale. For these data, medians were also calculated, which reflect the midpoint of the data where half of the responses were above and half of the responses were below the calculated number. The median provides a more balanced perspective on the JAR scale results than the average and is a better guide for making decisions on how to modify the product formulation. In the JAR scale, 0 is lacking, 7.5 is just about right, and 15 is intense. The preferred median score is 7.5.

TABLE 4

L.S. Means for the Appearance and Texture Attributes of Bean Dip.

| Sample | Overall Appearance | Overall Texture |
| --- | --- | --- |
| Table Salt | 10.21 | 10.86 |
| MCS plus salt | 10.22 | 10.71 |
| MPSC | 10.19 | 10.82 |

Table 4 shows the appearance and texture attributes. No significant differences exist in any of the other appearance or texture attributes.

TABLE 5

L.S. Means for the Flavor Attributes of Bean Dip.

| Sample | Bean Flavor | Saltiness* | Salt Level* | Off Flavor | Overall Flavor Acceptability |
|---|---|---|---|---|---|
| Table Salt | 9.44 | 8.07 | 7.55 | 5.40 | 9.13 |
| MCS plus salt | 9.44 | 8.15 | 7.55 | 4.79 | 9.19 |
| MPSC | 9.36 | 7.21 | 7.38 | 4.72 | 9.08 |

*JAR scale

Table 5 shows the flavor attributes. No significant differences exist in any flavor attribute. In the salt level (JAR scale), the control sample as well as the MCS plus salt and MPSC samples were very close to the JAR level at 7.55 and 7.56.

TABLE 6

L.S. Means for the Aftertaste and Overall Acceptability Attributes of Bean Dip.

| Sample | Aftertaste Off Flavor | Overall Aftertaste Acceptability | Overall Sample Acceptability |
|---|---|---|---|
| Table Salt | 5.61 | 9.05 | 9.14 |
| MCS plus salt | 4.69 | 9.75 | 9.77 |
| MPSC | 5.01 | 9.43 | 9.22 |

Table 6 shows the aftertaste and overall sample acceptability. These attributes were not significantly different.

The invention illustratively disclosed herein suitably may be practiced in the absence of any element, which is not specifically disclosed herein. It is apparent to those skilled in the art, however, that many changes, variations, modifications, other uses, and applications to the method are possible, and also changes, variations, modifications, other uses, and applications which do not depart from the spirit and scope of the invention are deemed to be covered by the invention, which is limited only by the claims which follow.

What is claimed is:

1. A modified chloride salt composition consisting of:
   about 10% to about 90% by weight potassium chloride and sodium chloride;
   about 0.1% to about 10% by weight food grade acidulant; and
   about 10% to about 80% by weight carrier,
   wherein the modified chloride salt composition is in the form of particles, and each particle of the modified chloride salt contains a homogenous mixture of potassium, sodium, chloride, food grade acidulant, and carrier.

2. The modified chloride salt composition of claim 1, wherein the food grade acidulant is selected from the group consisting of citric acid, malic acid, tartaric acid, fumaric acid, lactic acid, acetic acid, benzoic acid, and combinations thereof.

3. The modified chloride salt composition of claim 1, wherein the carrier is a starch.

4. The modified chloride salt composition of claim 1, wherein the carrier is selected from the group consisting of dextrin, maltodextrin, and combinations thereof.

5. The modified chloride salt composition of claim 1, wherein the carrier is selected from the group consisting of monosaccharide, disaccharide, and combinations thereof.

6. The modified chloride salt composition of claim 1, wherein the carrier is a cereal starch.

7. The modified chloride salt composition of claim 6, wherein the cereal starch is selected from the group consisting of rice starch, rice flour, and combinations thereof.

8. The modified chloride salt composition of claim 1, wherein the composition contains about 10-90% lower sodium than regular table salt.

9. The modified chloride salt composition of claim 1, wherein the composition contains about 30-60% lower sodium than regular table salt.

10. A food product comprising the modified chloride salt composition of claim 1.

11. The food product of claim 10, wherein the food product is selected from the group consisting of spice mixtures, soups, sauces, baked goods, meat products, dairy products, breakfast cereals, and table salt.

12. A method of making a modified chloride salt composition, the method comprising:
   a. contacting chloride salt with a food grade acidulant in an aqueous solution to form a liquid chloride salt product, wherein the chloride salt is a mixture of sodium chloride and potassium chloride;
   b. adding a carrier to the liquid chloride salt product to form a liquid modified chloride salt product, wherein liquid modified chloride salt product is a homogenous solution of potassium chloride, sodium chloride, food grade acidulant, and carrier; and
   c. drying the liquid modified chloride salt product to form a granular modified chloride salt product consisting of:
      about 10% to about 90% by weight potassium chloride and sodium chloride;
      about 0.1% to about 10% by weight food grade acidulant; and
      about 10% to about 80% by weight carrier,
      wherein each particle of the granular modified chloride salt product contains a homogenous mixture of potassium, sodium, chloride, food grade acidulant, and carrier.

13. The method of claim 12, wherein drying the liquid modified chloride salt product includes a technique selected from the group consisting of spray drying, drum drying, and combinations thereof.

14. The method of claim 12, comprising:
   contacting the granular modified chloride salt product with a second aqueous solution to form a wet granular modified chloride product; and
   drying the wet granular modified chloride salt product to form an enhanced modified chloride salt product.

15. The method of claim 14, wherein drying the liquid modified chloride salt product or the wet granular modified chloride salt product includes a technique selected from the group consisting of spray drying, drum drying, and combinations thereof.

16. The method of claim 14, wherein the second aqueous solution is a mixture of a second chloride salt and a solvent.

17. The method of claim 16, wherein the second chloride salt is selected from the group consisting of potassium chloride, sodium chloride, magnesium chloride, calcium chloride, ammonium chloride, and combinations thereof.

18. The modified chloride salt composition of claim 1, wherein the carrier comprises dextrose.

* * * * *

UNITED STATES PATENT AND TRADEMARK OFFICE
CERTIFICATE OF CORRECTION

| | | |
|---|---|---|
| PATENT NO. | : 9,629,384 B2 | Page 1 of 1 |
| APPLICATION NO. | : 13/863775 | |
| DATED | : April 25, 2017 | |
| INVENTOR(S) | : Bhandari et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this
Seventh Day of June, 2022

Katherine Kelly Vidal
*Director of the United States Patent and Trademark Office*